United States Patent [19]

Pomella et al.

[11] 3,748,563

[45] July 24, 1973

[54] NUMERICAL CONTROL DEVICES FOR MACHINE TOOLS TO PERMIT CONTINUOUS MOTION BETWEEN SEGMENTS OF THE DESIRED PATH

[75] Inventors: Piero Pomella; Luciano Lauro, both of Turin, Italy

[73] Assignee: Ing. C. Olivetti & C., S.p.A., Torino, Italy

[22] Filed: Nov. 12, 1970

[21] Appl. No.: 88,979

Related U.S. Application Data

[63] Continuation of Ser. No. 760,523, Sept. 18, 1968, abandoned.

[30] Foreign Application Priority Data

Sept. 19, 1967  Italy .............................. 53075 A/67

[52] U.S. Cl. ................................. 318/573, 318/571
[51] Int. Cl. ............................................. G05b 19/24
[58] Field of Search ......................... 318/573, 571

[56] References Cited

UNITED STATES PATENTS 3,109,974  11/1963  Hallmark ....................... 318/571 X
3,390,315  6/1968  McDonough et al. .......... 318/573 X

*Primary Examiner*—T. E. Lynch
*Attorney*—Birch, Swindler, McKie & Beckett

[57]  ABSTRACT

A numerical control device for such as machine tool operation, in which position and speed of movement of the tool or the workpiece is automatically effected in accordance with a preset program and certain recorded preselected information. The control provides for movement along a segment of the desired path generally in three phases: 1) acceleration to a predetermined maximum speed; 2) constant speed, and, 3) deceleration to zero speed. However, provision is also made for continuous movement along adjacent path segments through elimination of the third phase of the first segment.

5 Claims, 10 Drawing Figures

NUMERICAL CONTROL DEVICES FOR MACHINE TOOLS TO PERMIT CONTINUOUS MOTION BETWEEN SEGMENTS OF THE DESIRED PATH

This application is a continuation of Ser. No. 760,523, filed Sept. 18, 1968, now abandoned.

GENERAL DESCRIPTION

The present invention relates to a device for effecting continuous numerical control of the positioning of a movable part of a machine tool or other equipment and comprising an interpolating unit, of the type described in our application Ser. No. 575,802, now U.S. Pat. No. 3,518,513 filed Aug. 29, 1966, hereinafter called our earlier specification.

The device described in our earlier specification for continuous numerical control along one or more axes is fed by a program unit adapted to supply discontinuous position orders and comprises an interpolating unit operating by accumulating position increments in successive interpolation cycles. The interpolating unit feeds, for each of the axes, a separate servo-mechanism adapted to effect the positioning of the movable member. The amount of the increment accumulated in each interpolation cycle is variable for the purpose of controlling the speed and acceleration of the movable part along its path.

This device operates as a computer for continuously calculating the points of a path approximating to a line consisting of any number of rectilinear segments. This computer therefore constitutes an interpolating unit which, fed by an adequate number of items of geometrical and technological data recorded, for example, on a perforated paper tape, continuously supplies the positioning data relative to all the intermediate points included in the path joining the break points of the program.

The device described in our earlier specification is adapted to control even very complex machining operations which require the simultaneous and coordinated movement of the movable part of the machine along a plurality of axes, while the necessary programming is simple, it being necessary to program only the coordinates of successive discrete points along the path and a predetermined value corresponding to the maximum permitted speed of advance along each portion or length of line joining two successive discrete points.

In the device described in our earlier specification, the interpolating unit is provided with a cyclic memory comprising a plurality of recirculating registers, the duration of the cycle of said memory being a submultiple of the duration of each of the interpolation cycles, whereby each interpolation cycle comprises at least two memory cycles in the first of which logical comparison operations are carried out to decide the changes of acceleration, while in the second memory cycle the calculation of the position increment relative to the interpolation cycle is carried out on the basis of the results of said comparison operation.

In some applications of the numerical control device, the stopping of the movable part at the break points of the successive segments of the path results in unnecessary losses of time. This is particularly true in the case where the line segments are covered for the purpose of approximating a curve with ideally continuous curvature. In this case, the stopping at each break point causes, in addition to useless waiting, a certain imperfection of the path followed in the vicinity of the break in the curvature. These drawbacks are particularly serious in the case where the device is used to control a high-precision machine tool.

According to the present invention there is provided a numerical control device for positioning a movable part along one or more axes, comprising a programming unit adapted to furnish discontinuously the coordinates of break-points of a segmented path to be followed by the movable part, and an interpolating unit arranged to operate cyclically to compute in real time, in respect of the or each axis, a coordinate for controlling a servo-system pertaining to that axis, by the process of accumulating in each cycle a position increment which is variable from cycle to cycle to control the speed and acceleration of the movable part, the interpolating unit being further adapted to cause a break-point to be traversed without stopping by causing the final part of one segment of the path and the initial part of the next segment each to be covered at constant speed, and the interpolating unit being provided with means for precomputing during the travel along the one segment the speed along the or each axis at which at least the initial part of the next segment is to be covered.

The invention will become clear from the following description of a preferred constructional form, given by way of example only, with reference to the accompanying drawings, in which.

The control device according to our earlier specification permits continuous control of the positioning of the movable part of a machine tool, or of similar equipment, through a separate servo-system for each axis which is adapted to position the movable part under the control of position orders recorded in a program unit and supplied discontinuously to the device.

In the following description, reference will be made to a machine tool in which the movable part is displaceable along two or more axes. For example, it will be assumed that displacements along two axes (X,Y or X,Z, or Y,Z) are possible for the movable part, which may be constituted by the tool of the machine which is subjected to shifting relative to the workpiece or, conversely, it may be constituted by the workpiece, which carries out movements with respect to the fixed tool.

Figure 1:
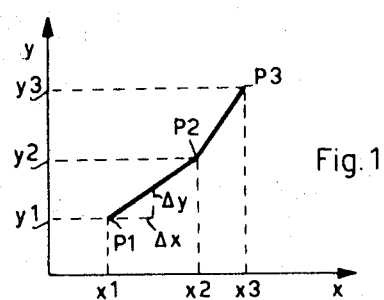
FIG. 1 shows an example of the path of the movable part of a machine controlled by the device according to our earlier specification.

Let it be assumed that said movable part carries out movements along a continuous path (located in the plane of the axes X and Y) which is approximated by a series of straight line segments, the break points or termini of the segments lying on the ideal continuous line and being constituted by points defined by the recorded program. The movable part of the machine therefore moves with a rectilinear motion between each pair of successive break points of the program in the plane specified by the coordinates X,Y of the points (FIG. 1).

The preparation of the program is effected in a similar manner to that for a point-to-point positioning device. For each rectilinear segment P1 – P2, P2 – P3, . . . of the path, it is sufficient to sepcify the coordinates of the end point and the speed of advance or feed rate. In general, the coordinates and speed of advance or feed rate may be specified at the beginning of the program and whenever their value is modified, it being sufficient to provide the interpolating unit with a memory storing the coordinates and speed for all the path segments for which they are considered valid.

The program is therefore constituted by a series of program blocks, each block comprising a sequence of data of the type IX – IV – K1V – K2V – K3V – K4V – K5V – IX – SX – K1X – K2X – K3X – K4X – K5X – K6X – K7X – IY – IV – K1V – K2V – K3V – K4V – K5V – IY – SY – K1Y – K2Y – K3Y – K4Y – K5Y – K6Y – K7Y – CR, in which IV, IX, IY are address characters indicating that the information immediately following relates to the speed V, the axis X and the axis Y, respectively; SX and SY are characters indicating the algebraic signs of the X and Y coordinates respectively of the arrival point of the rectilinear path segment along which the movable part must travel; the characters K1V to K5V represent the five decimal digits of a number defining the value of the speed V; the characters K1X TO K7X and K1Y to K7Y represent the seven decimal digits of a number defining the value of the X and Y coordinates respectively of the arrival point; CR is an end-of-block character causing the starting of the interpolation device for the execution of the positioning order contained in the sequence of data of the same block. The block of characters relating to a displacement axis and the character CRC can be preceded by characters AU1 – AUN for control of auxiliary functions of the machine tool, such as speed and direction of rotation of the chuck, lubrication, automatic tool change, and so on.

It should be observed that the seven characters K1X to K7X and K1Y to K7Y enable decimal values of the X and Y coordinates between 1 $\mu$m and 10 m to be expressed, which is sufficient to satisfy the approximation required for the coordinates and to express the coordinates of the maximum strokes or travels. The five characters K1V to K5V, in turn, are amply sufficient to express the speed values normally employed in machine tools, as will be further specified in the following description.

Therefore, the positioning data introduced into the interpolation unit in the form of a program block comprises only the maximum feed rate or speed and the coordinates of the arrival point. The further information necessary for the linear interpolation of the path of the movable part between the starting point and the arrival point is calculated by the interpolation unit in the manner which will now be described.

Figure 2:
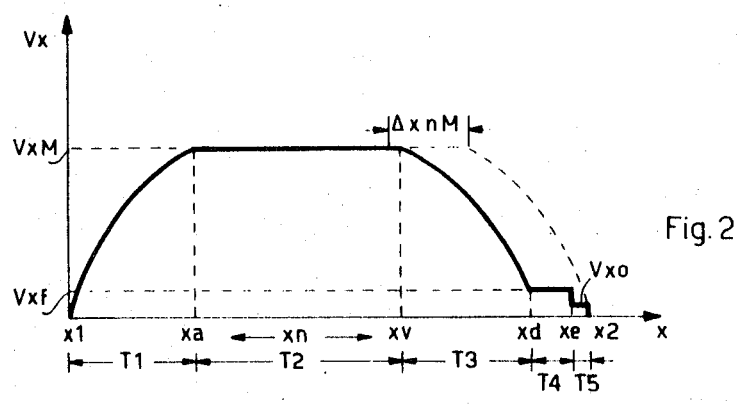

The type of motion to be performed by the movable part of the machine between a starting point and an arrival point is generally as follows: From the starting point, for example P1 ($x1$, $Y1$), the movable part must accelerate along the rectilinear path segment until it reaches the maximum permitted feed rate or speed and it must then proceed at constant speed until, at a certain distance from the arrival point, it must decelerate to reach the arrival point P2 ($x2$, $y2$) at zero speed. This type of motion is shown in FIG. 2, in which reference is made only to the movements along the axis X, indicated as abscissa, while the values of the speed $Vx$ along this axis in the segment identified by the coordinates $x1$ and $x2$ are shown as the ordinate. A similar diagram applies for movements along the axis Y. It is preferred that the segments between the coordinates $x1$ and $xa$ and between the coordinates $xv$ and $xd$ are covered at constant acceleration and constant deceleration, respectively. So that the path covered between two end points P1 and P2 of a segment programmed as rectilinear may in fact be rectilinear, it is necessary that the ratio between the increments of the two coordinates $x$ and $y$ which are produced in the same time interval be always equal to the ratio of the distances ($x2 - x1$) and ($y2 - y1$) between said two end points, measured along said axes X, Y (FIG. 1), that is:

$$dx/dy = (x2 - x1)/(y2 - y1)$$

in which $dx$ and $dy$ indicate the increments of the coordinates $x$, $y$ (position increments) which are produced in the time interval. Therefore, the instantaneous speeds along the two axes, and also the instantaneous accelerations along the two axes, will also be in the said ratio to one another.

In order to travel along the rectilinear path between P1 and P2 at a feed rate or speed which follows the diagram of FIG. 2, it is necessary to effect a series of calculations, which are made in the interpolating unit in accordance with the principles hereinafter described. The interpolating unit operates cyclically, DT being the constant duration of an interpolation cycle. The movement component along the axis X will be considered first.

Consequently, let $x1$ be the coordinate of the initial point P1 of the rectilinear path described by the movable part; $x2$ the coordinate of the final arrival point P2, $xn$ the coordinate of that point on the path between P1 and P2 at which the movable part is located at the instant $Tn$, the beginning of the $n$th interpolation cycle; $Dxn$ the increment given to $xn$ during the ($n - 1$)th interpolation cycle (this increment, which will hereinafter also be called the position increment, is approximately proportional to the instantaneous speed along the axis X, since DT is constant); $hx$ the increment given to $Dxn$ during an interpolation cycle in the acceleration phase T1 and the deceleration phase T3 (this increment is approximately proportional to the instantaneous acceleration along the axis X, since DT is constant); $DxM$ a constant pre-established before the beginning of the interpolation and indicating the maximum increment permissible for the coordinate $xn$, that is, because of what has been said, the maximum speed permissible along the axis X.

Generally, during the whole of the interpolation of the path between $x1$ and $x2$, the interpolating unit must satisfy the condition $$Dxn/Dyn = (x2 - x1)/(y2 - y1) \qquad (1)$$

so that the path may be rectilinear.

Moreover, during the initial phase T1 (FIG. 2) of constant acceleration, the interpolating unit operates in accordance with the following formulae:

$$Dx(n + 1) = Dxn + hx \qquad (1)$$
$$x(n + 1) = xn + Dx(n + 1) \qquad (3)$$

Formula (3) establishes what must be the position $x(n+1)$ of the movable part at the end of the $n$th interpolation cycle on the basis of the position $xn$ at the beginning of this cycle.

Formula (2) establishes, on the basis of the position increment $Dxn$ used in the preceding interpolation cycle, what must be the position increment (speed) $Dx(n+1)$ to be used in the present $n$th interpolation cycle.

As $hx$ is constant, it is clear that formula (2) ensures that the section or segment $x1 - x2$ of the path is covered at a constant acceleration proportional to $hx$.

In this initial phase T1, apart from (1), (2) and (3) which are interpolation operations proper, the following additional operations are carried out for the purpose of calculating data necessary for determining the instants when the changes of acceleration take place in the diagram of FIG. 2;

$$\sum_{1}^{n} Dxn = \sum_{1}^{n-1} Dxn + Dxn \quad (4)$$

$$\sum_{1}^{n} Dxn + Dxn = Pxn \quad (5)$$

$$x2 - xn = Rxn \quad (6)$$
$$Dxn > DxM \quad (7)$$

Operation (4) defines the value of the progressive distance $$xn - x1 = \sum_{i}^{n} Dxn$$

travelled by the movable part from the beginning $x1$ of the present rectilinear path segment to the end of the $(n-1)$th interpolation cycle, this progressive distance being derived from the progressive distance $$\sum_{1}^{n-1} Dxn$$

travelled at the end of the $(n-2)$th interpolation cycle and from the position increment $Dxn$ which has occurred in the $(n-1)$th interpolation cycle.

Operation (5) defines the value of a fictitious distance $Pn$ equal to the aforesaid progressive distance $$\sum_{1}^{n} Dxn = xn - x1$$

increased by the last increment $Dxn$.

Operation (6) defines the value $Rxn$ of the remaining distance which the movable part must still travel at the end of the $(n-1)$th interpolation cycle to reach the final point $x2$.

Moreover, during the entire phase T1 of constant acceleration, the comparison operation (7) is carried out at each interpolation cycle, that is a check is made to see whether the instantaneous speed (position increment) $Dxn$ has or has not exceeded the maximum permissible speed $DxM$.

Simultaneously, during this phase T1, operations similar to (4), (5), (6) and (7) are carried out for the Y axis in the interpolating unit, these operations being obtainable from the operations (4), (5), (6) and (7) by simply substituting the letter $y$ for the letter $x$.

The initial phase T1 of constant acceleration terminates at the end of that interpolation cycle in which the inequality (7) has occurred for the axis X or for the axis Y. More precisely, the phase T1 terminates at the end of that interpolation cycle in which, on the basis of formula (2), there has been calculated for the axis X or for the axis Y an increment $Dxn$ or $Dyn$ greater than the maximum permissible increment $DxM$ or $DyM$. The last increments calculated (that is, the speeds reached) at the end of the phase T1 will hereinafter be referred to as $DxnM$ and $DynM$ respectively. It is to be noted that the final increments $DxnM$ and $DynM$ may exceed the maximum increments $DxM$ and $DyM$ by an amount not greater than the minimum increment $hx$ and $hy$, respectively. That is, the phase T1 terminates when there has been reached either along the X axis or along the Y axis the maximum speed permissible for that axis. It should be noted that, depending on the inclination of the path with respect to the axes and on the possible diversity of the maximum speeds permitted for the two axes, it may happen that the inequality (7) occurs first for the X axis or for the Y axis.

At the end of the phase T1, the summation $$\sum_{1}^{n} Dxn$$

obtained on the basis of formula (4) represents the total distance $xa - x1$ which has been travelled along the axis X at the end of the interpolation cycle in which the maximum permitted speed has been reached or exceeded either along the X axis or along the Y axis. The distance $xa - x1$ therefore represents the distance which it has been necessary to travel in order to reach the maximum speed at constant acceleration.

The value $PxnM$ of the fictitious distance $Pnx$, which corresponds to the distance $xa - x1$ increased in accordance with formula (5), is stored in a suitable register at the end of the phase T1 and is preserved therein.

The initial phase T1 of constant acceleration is followed (FIG. 2) by the phase T2 of constant speed, during which the movable part continues its movement at a speed equal to $DxnM$ for the X axis and to $DynM$ for the Y axis, which is reached at the end of the phase T1.

During this phase T2, the interpolating unit carries out the following operations:

$$x(n+1) = xn + DxnM \quad (3')$$
$$x2 - xn = Rxn \quad (6)$$
$$Rxn < PxnM \quad (8)$$

Formula (3') is similar to formula (3), with the difference that the position increment in the successive interpolation cycles is now constant and equal to $DxnM$, whereby the speed becomes precisely constant.

Formula (6) has already been explained.

Inequality (8) is verified by comparing at each interpolation cycle the remaining distance $Rxn$ which is still to be covered to reach the final point $x2$ with the fictitious distance $iPxnM$ stored in the register. The phase T2 of constant speed terminates at the end of the interpolation cycle in which the inequality (8) has occurred for the first time.

The phase T2 of constant speed is followed in (FIG. 2) by the phase T3 of constant deceleration, during which the movable part decelerates with the same absolute acceleration values (proportional to hx and hy, respectively, for the two axes) already used in the acceleration phase T1.

During the phase T3, the interpolating unit carries out the following operations:

$$Dx(n + 1) = Dxn - hy \qquad (2')$$
$$x(n + 1) = xn + Dx(n + 1) \qquad (3)$$
$$Dxn < 1 \ \mu m \qquad (9)$$

Operation (2') is similar to operation (2), apart from the sign of the speed increment $hx$.

The comparison operation (9) is used to establish, in the manner hereinafter explained, the end of the constant deceleration phase.

Comparison (8) for establishing the start of the deceleration is made by considering the fictitious distance $PxnM$, suitably increased in the manner which has already been stated with respect to the distance travelled during acceleration, instead of considering exactly the last-mentioned distance, because it is desired to guard against the possibility of the movable part arriving during deceleration at the final position $x2$, $y2$ with a speed different from zero and therefore continuing unduly beyond the arrival point P2. This contingency, which would be of no consequence in a positioning arrangement of the point-to-point type, must be avoided here, since the entire path must be controlled, for example because it is traversed for the purpose of cutting a profile. It should be noted that, in order to avoid this contingency, it would not be sufficient to interrupt the interpolation and give a stop order to the movable part as soon as the distance $x2 - xn$ becomes less than the desired approximation, because it could happen that the speed reached during deceleration at that instant is still too high for the remaining space to be sufficient for stopping. On the other hand, in order to avoid this contingency, it is necessary, as has been done, to provide for the deceleration a distance equal to that travelled during acceleration plus an additional safety space sufficient for stopping, and since, during the phase T2 of constant speed, the coordinate $xn$ increases by increments $DxnM$, this additional space cannot be less than $DxnM$.

Therefore, as the beginning of the phase T3 is determined by applying the comparison indicated by (8), that is as the deceleration begins as soon as the distance from the arrival point P2 is less than the distance travelled during acceleration plus $DxnM$, the movable part of the machine will have time to complete the deceleration before passing the final point P2. More particularly, it would not reach the arrival point P2, being left with a position error which is at the most $-DxnM$ or $-DynM$, respectively, for the X and Y coordinates.

It is therefore necessary that the constant deceleration phase is not protracted until stopping occurs, but is interrupted before stopping occurs and replaced by a movement of approach to the final point P2 which is carried out at low speed. It would be possible to effect this movement of approach at constant speed until the remaining distance $x2 - xn$ (or $y2 - yn$) reaches a limit value sufficiently low to guarantee the required accuracy of positioning and interrupt the interpolation at that point.

If however, the speed of the movement of approach is chosen too low, too much time is lost. If, on the contrary, the speed is chosen too high, it may happen that the final point will be passed during the movement of approach. This last-mentioned drawback may occur both because the inertia of the movable part does not permit stopping in good time, once it has been verified that the residual distance $x2 - xn$ is less than the predetermined limit, and because the position increment $Dxn$ effected during an interpolation cycle is greater than the required positioning accuracy, so that it may happen that in the course of a single interpolation cycle at the beginning of which the movable part has not yet reached the final position with the required approximation, the movable part passes the final point itself without there being any possibility of becoming aware of such passing.

A better solution is that illustrated in FIG. 2, in which the movement of approach is split into two phases T4 and T5.

The phase T4 starts when the inequality (9) occurs. During this phase T4, the interpolating unit carries out the following operations:

$$x(n + 1) = xn + Dxnf \qquad (3'')$$
$$x2 - xn < 16 \ \mu m \qquad (10)$$

Operation (3'') produces the movement at constant speed, that is at constant position increments equal to the increment $Dxnf$ reached at the end of the deceleration phase, that is reached on the first occurrence of inequality (9). The comparison operation (10) produces the end of the phase T4.

During the phase T5, the interpolating unit carries out the following operations:

$$x(n + 1) = xn + hx \qquad (3''')$$
$$x2 - xn < 1 \ \mu m \qquad (10')$$

Operation (3''') produces the movement at constant speed equal to $hx/DT$. The choice of this speed value, though not necessary, is convenient. The comparison operation (10') produces the end of the phase T5 and therefore also the end of the entire interpolation.

It is therefore clear that the phase T3 finishes when, during the deceleration, a sufficiently low speed is reached, for example, corresponding, according to (9), to a position increment 1 $\mu$m effected during an interpolation cycle, and that the phase T4 finishes when the movable part has arrived at a prefixed distance from the final point P2, said distance being, for example, 16 $\mu$m in accordance with formula (10); and that the final phase T5 finishes when the movable part has arrived, in accordance with (10'), at a distance from the final point less than the desired accuracy (which has been assumed to be equal to 1 $\mu$m).

Once the movable part has been brought to a position less than 1 $\mu$m (required accuracy) from the final point, the interpolation is interrupted, as has been seen, and the movable part can be stopped and locked in position by any known means, for example a braking system or a mechanical clamp. Preferably, however, the movable part is held in position by the same positioning servo-mechanism fed with constant position orders. To this end, the position order may be either that constituted by the last coordinates calculated during the interpolation, or preferably that constituted by the coordinates of the final point P2 which are supplied by the program unit.

Figure 3:
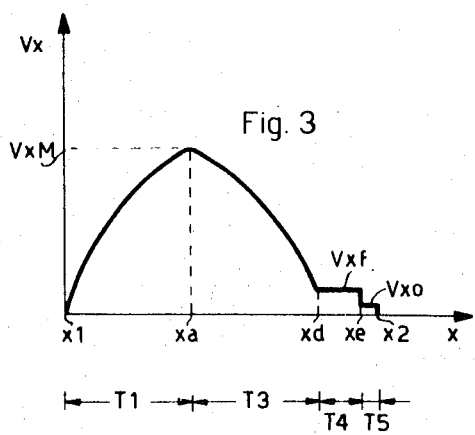

Apart from the case illustrated in FIG. 2, other cases may occur according to the distance to be travelled between the points P1 and P2. FIG. 3 shows the case where the segment covered at constant speed VxM is missing from the speed diagram, since the conditions which produce the start of the deceleration phase occur before the acceleration phase finishes. The displacement of the movable part of the machine between the positions $x1$ and $x2$ therefore comprises an initial acceleration phase of duration T1, between the positions $x1$ and $xa$, at the end of which the speed reached is less than or equal to the maximum permitted speed, and an immediately following deceleration phase of duration T3, between the positions $xa$ and $xd$; these phases are followed by the phases T4 and T5 at constant stepped-down speeds, in a similar manner to the case of FIG. 2. The position $xa$ is determined by the occurrence of the start-of-deceleration condition (8) that is $$x2 - xn < (\sum_{1}^{n} Dxn) + Dxn,$$

or by the occurrence of the corresponding condition for the axis Y.

Figure 4:
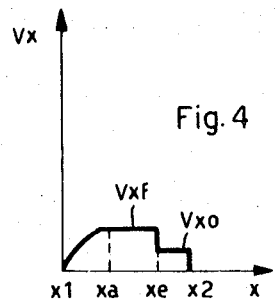
FIGS. 2, 3, 4 and 5 show possible speed versus displacement diagrams for the movable part controlled by the device according to our earlier specification.

FIG. 4 shows the case where the distance $x2 - x1$ is greater than the limit 16μm and such that (8) occurs while (9) is also valid at the same time; in these circumstances, there is an acceleration phase from $x1$ to $xa$, followed by a phase at constant speed $Vxf$ with a constant increment $Dxnf$ equal to the last increment $Dxn$ of the acceleration phase. Thereafter, when operation (10) has taken place in the position $xe$, there will be a phase from $xe$ to $x2$ at constant speed $Vxo$ with $Dxn = hx$.

Figure 5:
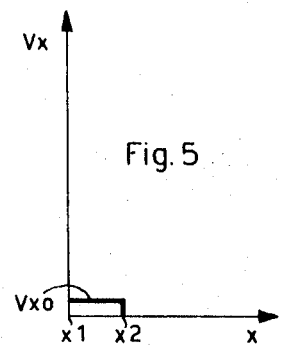

FIG. 5 shows the case where the difference $x2 - x1$ is less than 16 μm. In these circumstances, the condition (10) is immediately realized and the movement between $x1$ and $x2$ therefore takes place at constant speed $Vxo$ with $Dxn = hx$.

It has therefore been seen what are the principles governing the interpolation operation.

The values $DxM$ and $DyM$ which are proportional to the maximum permissible speed for the movable part along the axes X and Y, respectively, are supplied as data by the program unit in the form of the digits K1V to K5V. The values hx and hy, which are proportional to the acceleration along the axes X and Y, respectively, during the constant acceleration and deceleration phases, are calculated, on the other hand, from the program data, in particular from the coordinates of the end points of each rectilinear path segment, taking into account, moreover, that they must always be less than the value corresponding to the maximum permissible acceleration along each axis. In a preferred embodiment, this maximum acceleration may be chosen from among a plurality of values, on the basis of the type of machine used and the type of machining carried out, as will be seen.

In the calculation of the aforesaid values hx and hy which, in the constructional form described here, also correspond to the value of the minimum increment which the coordinates xn and yn, repectively, may undergo in an interpolation cycle, account is moreover taken of the angular accuracy with which it is desired that the rectilinear path be covered. It should be noted, in fact, that as the path is covered by means of an interpolation obtained by accumulating the position increments $Dxn$, $Dyn$, which in turn are multiples of the values $hx$ and $hy$, respectively, any error in the initial calculation of $hx$ and $hy$ has the effect of causing a path to be covered which is still rectilinear, inasmuch as (1) continues to be observed, but is not quite properly inclined with respect to the axes X, Y, so that the final point of the path thus calculated by the interpolating unit will not coincide with the programmed final point. If it is desired that the distance between the two final points should not exceed the maximum permitted inaccuracy of positioning along each axis, it will be necessary to limit suitably the inaccuracy with which hx and hy are calculated.

Assuming, for example, that the maximum inaccuracy of 1 μm hereinbefore established is also retained at the end of a displacement P2 − P1 equal to the possible maximum of the order of 10m, that is $10^7$ μm, it will be necessary that the increments hx and hy of the coordinates xn and yn, respectively, be determined with an approximation equal to $10^{-7}$ μm (or, in binary form, with an approximation equal to $2^{-24}$ μm).

In order to calculate the values hx and hy so that:

a. their ratio is equal to $(x2 - x1)/(y2 - y1)$, that is so that they also satisfy the equation (1);

b. the said values are determined with an accuracy sufficient to ensure the angular accuracy desired for the path;

c. the said values do not exceed the value corresponding to the maximum permissible acceleration;

the procedure hereinafter described is followed.

The quantities $(x2 - x1)H$ and $(y2 - y1)H$ are calculated, in which $x2 - x1$ and $y2 - y1$ are expressed as pure binary numbers formed of 24 bits, so that their value is deifned with an accuracy of $2^{-24}$, which, as has been seen, ensures compliance with the condition b), and in which H is a non-dimensional constant equal to a power of 2, and such that $(x2 - x1)H$ and $(y2 - y1)H$ must be less than the maximum speed increment (acceleration) permissible for the machine. H is a constant which can be set up on a switch of the machine. Thereafter, the two quantities $(x2 - x1)H$ and $(y2 - y1)H$ are multiplied simultaneously and repeatedly by 2, until one of the two quantities reaches the value corresponding to the maximum accleration.

It is clear that in the aforesaid successive multiplications by 2, the aforesaid quantities continue to satisfy the condition a). Moreover, they also continue to satisfy the condition b), provided that no binary digit is discarded in carrying out the successive multiplications. It is moreover clear that, by stopping the successive multiplications at the moment that has been mentioned, the condition c) is observed.

Figure 6:
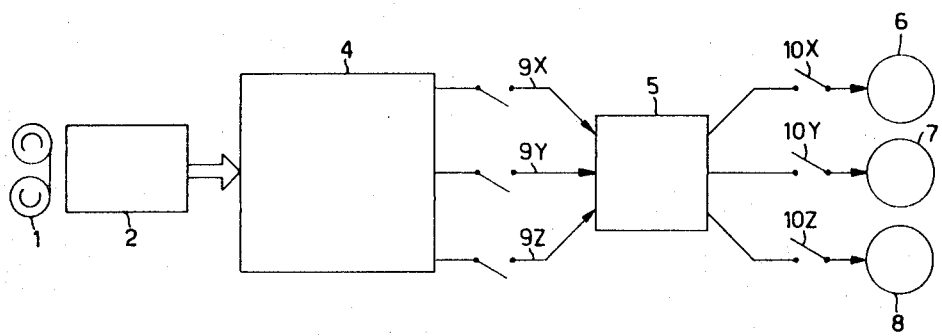
FIG. 6 is a block diagram of a device according to the present invention.

In a preferred embodiment as shown in FIG. 6, the control device is fed by a program unit comprising a tape 1 carrying a recorded program, and a tape reader 2. The control device comprises an interpolating unit 4 which is essentially a digital computer feeding a digital-to-analog converter 5, which in turn feeds the servomechanisms 6, 7, 8 adapted to position the movable part along the axes X, Y and Z, respectively, assuming that the machine tool has three axes to be controlled.

The operation of the control device comprises a first period in which the program unit supplies to the interpolating unit 4 the data hereinbefore described, that is the coordinates x2 and y2 of the final point P2 of the path, and the maximum speeds *DxM* and *DyM* at which the path is to be covered. During this period, the movable part is stationary at the starting point P1. A second period follows in which, while the movable part still remains stationary and the program unit moreover remains inoperative, the interpolating unit 4 sees to the calculation of the values *hx* and *hy* (speed increments) on the basis of the principles hereinbefore set forth. A third period follows in which, while the program unit remains inoperative, the interpolation true and proper takes place. During this third period, the interpolating unit 4 is operative to control in real time the positioning of the movable part.

More particularly, the servo-mechanisms 6, 7, 8 are position servo-mechanisms, that is they are adapted, when a position order has been received, to bring the movable part into the position indicated in that order, the speed and the instantaneous acceleration of the movement being determined by the instantaneous value of the position error. More particularly, the servo-mechanisms and the manner in which they are fed by the digital-to-analog converter 5 are generally of the kind described in Joseph Elbling application Ser. No. 400,986, now U.S. Pat. No. 3,515,962 filed Oct. 2, 1964.

It is therefore clear that the servo-mechanisms receive position orders at a rate depending on the rate at which the interpolation cycles follow one another.

In one embodiment there is provided for each displacement axis of the machine tool a separate digital-to-analog converter which is fed at its input by the digital signal processed by the interpolation unit and supplies an analog control signal at its output to a transducer controlling the movement of the movable part of the machine along the corresponding displacement axis.

If the transducer is a cyclic position measuring device, in order to position the movable part of the machine it is sufficient to specify digitally the absolute position within each cycle or step of the measuring device. The use of a cyclic position measuring device for each displacement axis enables the number of binary digits necessary for representing all the possible positions of the movable part along the axis to be reduced. For example, by using a position measuring device of the type described in U.S. Pat. No. 2,799,833, comprising a fixed multipolar winding and a pair of movable windings fast with the movable part of the machine, the position of the movable part can be represented by the relative displacement, expressed in electrical degrees, between the fixed winding and the movable windings. Assuming that the pole pitch of the fixed winding is equal to 2 mm and, if it is desired to achieve for the positioning an approximation of 1 $\mu$m, the positions between 1$\mu$m and 2 mm within each step will be expressible by means of the 10 least significant binary places of the number representing the value of the coordinate; the other more significant binary places of this number may be disregarded for the purposes of representing the position along the axis in question, inasmuch as they only indicate the number of complete steps of the position measuring device which have already been covered.

In another embodiment, if it is desired to reduce the number of digital-to-analog converters that are necessary, a single converter is used for all the displacement axes. In this case, it is necessary to transmit the information signals to the transducers relating to the various displacement axes by the time-division technique. That is, the axes are addressed cyclically for the transmission of the corresponding signals and, therefore, the information signals relating to the same instant of time are distributed to the various axes at successive times. This is shown symbolically in FIG.6, in which the switches 9X, 9Y, 9Z are understood to be closed cyclically to feed the digital-to-analog converter 5, and similarly the switches 10X, 10Y, 10Z are understood to be closed cyclically to feed the servo-motors 6, 7, 8.

The considerations hereinbefore discussed for the case of only two displacement axes X and Y are immediately applicable to the case of three displacement axes X, Y, Z.

In particular, a relation similar to (1) must also exist between the coordinates $xn$ and $zn$; moreover, all the operations and comparisons hereinbefore examined in describing the interpolation will be carried out on the coordinate $zn$.

Interpolating Unit

A complete description of the interpolating unit is contained in U.S. Pat. No. 3,518,513; note particularly column 12, lines 63–75; column 13–16; and column 17, lines 1–44. Only the ideas necessary for understanding the subject-matter of the present invention are recalled here.

The interpolating unit essentially comprises a closed loop comprising a cyclic memory constituted by a delay line, writing and reading registers connected to the input and output respectively of said delay line and an arithmetical unit connected between the registers. The delay line, for example of the magnetostrictive type, has a delay of, for example, 2.4 ms. More particularly, the memory is of the type described in Perotto and De Sandre application Ser. No. 701,193, filed Jan. 29, 1968 now U.S. Pat. No. 3,469,244, and is only briefly described here. Bits with a duration of 1$\mu$s are written in the delay line and this is therefore able to contain a maximum of 2,400 bits.

The interpolating unit moreover comprises a timing device permitting the association with each bit issuing from the delay line of a special digit specifying the position of the bit within the store. The timing of the delay line is scanned by the timing device with a frequency of 1 MHz.

The delay line is not completely filled by the bits circulating therein; there are only 2,160 bits of information which it is necessary to record in the delay line and, at the nominal frequency of 1 MHz these occupy only 2,160 $\mu$s of the 2.4 ms corresponding to the actual delay length of the delay line.

The timing device is activated from the first bit issuing from the delay line and, when it has counted all the 2,160 binary places of the memory, a STOP signal is produced and stops the device.

For each axis X, Y, Z, the memory comprises 12 registers A, B, C, . . . N, each comprising 60 binary places DE00 – DE 59, defined in increasing order, in all precisely 3 × 12 × 60 = 2,160 binary places. If a group of 12 bits of the same binary order belonging to the 12 registers, respectively, is considered, these bits represent 12 binary digits of the corresponding 12 digital quantities contained in said registers and are recorded in series on the delay line; another group of 12 bits of the same binary order, representing the 12 binary digits of the immediately following order (higher or lower) of said quantities is recorded in the delay line in series with the first group. The 12 registers are therefore disposed in the delay line in time division multiplex form. If we indicate the $n$th binary place of the generic register K by DEnK, the arrangement of the binary places in the delay line will therefore be, for each axis, DE00A; DE00B, DE00C, . . . DE00N; DE01A, DE01B, DE01C, . . . DE01N; . . . DE59A, DE59B, DE59C, . . . DE59N. The three groups of 12 × 60 bits ordered in this way and referring to the three axes are arranged in the delay line one after the other.

The manner in which the binary places of the various registers are specified will now be described in greater detail.

A bit order counter counts from 1 to 60, energizing the signals DE00 to DE59 separately and successively. For each of the 12 registers of the memory, the signal DE00 to DE59 specify the first second, . . . 60th bit, that is the binary places from 0 to 59.

The places DE01 to DE056, specified by signals DE01 – DE56, respectively, are used to represent the digital values $2^{-33}$ μm to $2^{24}$ μm (that is, in decimal form, the values between $10^{-10}$ μm and $10^{7}$ μm), which enable all the positions between 1 μm and 10 m to be represented with the required approximation of $2^{-24}$ μm. Therefore, the position specified by DE33 corresponds to the value 1 μm. It is therefore clear that all the quantities are represented in the memory registers by means of 56 bits.

All these 56 bits are processed in the arithmetical operations either of transfer or comparison carried out by the interpolating unit.

On the other hand, the data introduced by the program unit consist of only 24 significant bits representing, in the case where the data are coordinates, the values from 1 μm to $10^{7}$ μm. In the operations of introducing the data from the program unit into the store, the said 24 bits are therefore introduced into the 24 binary places corresponding to the order of these bits, it being understood that the remaining binary places to the right and left of the 24 binary positions are filled with bits equal to zero. Thus, for example (FIGS. 12 and 13), the 24 bits of $x2$ (which represent values between 1 μm and $2^{24}$ μm) are introduced into the register D in the binary places DE33 to DE56. Similarly, the 24 bits of $DxM$, which represent values of the maximum increment (maximum permitted speed) and which respectively correspond to the values $2^{-13}$ μm to $2^{10}$ μm, are introduced into the register B in the places DE20 to DE43, specified by the signals DE20 to DE43.

It is also obvious that, in the case where the interpolating unit according to the invention is applied to the control of a machine tool, the speed range, represented by the range of the values of $DnM$, is excessive and, for normal uses, 14 significant bits in the places from 30 to 43 representing values of the maximum increment between $2^{-3}$ μm and $2^{10}$ μm will be sufficient; assuming that the output of a ccordinate $xn$ from the interpolating unit takes place every 5 ms (period of the memory cycle), there will be obtained in correspondence, values of the speed which range between 1.4 mm per minute and 12.288m per minute, which are sufficient for all normal purposes. Such values of the maximum increment may also be expressed in decimal form by the use of five digits, as has already been assumed in the section giving the general description.

The place DE57 is used to store the sign of the number. More precisely, as complements are used in place of negative binary numbers, this place will be used to distinguish a positive number from a complemented number.

The place DE58, specified by the signal DE58, is used to store carries.

The places DE59 and DE00, specified by the signals DE59 and DE00, respectively, remain free in all the store registers and act as separating places between the registers of different axes, thus avoiding the carries having to be propagated from one axis to the adjacent one.

In the memory there is first written all the information relating to the axis X (in all 12 × 60 = 720 bits), then that relating to the axis Y (720 bits), and then that relating to the axis Z (720 bits). In all, therefore, there are 2,160 binary places in the memory which are occupied for the three axes.

The bit order counter repeats the count of the 60 binary places three times, once for each address X, Y, Z. The times relating to the three addresses are specified by singals INIC, INIP and INAZ, respectively, which are generated by another counter controlled by the bit order counter.

A counter controlled by the signal timing the end of the information in the store alternately activates its own outputs GIRI and $\overline{GIRI}$; the period of the signal GIRI is therefore equal to two circuits of the information along the delay line and this period characterises the duration of an interpolation cycle.

Seen from the external computing unit, the memory is equivalent to an assembly of six recirculating registers A, C, E, S, I and M in parallel, plus another six recirculating register B, D, F, H, L and N in parallel having their inputs and outputs in common with the first six registers, respectively, and out of phase with respect to the first six registers. The registers A, E, I and C and B, F, L and D are used as described in our earlier specification. The use of the registers G, M, H and N will be explained below.

Figure 8:
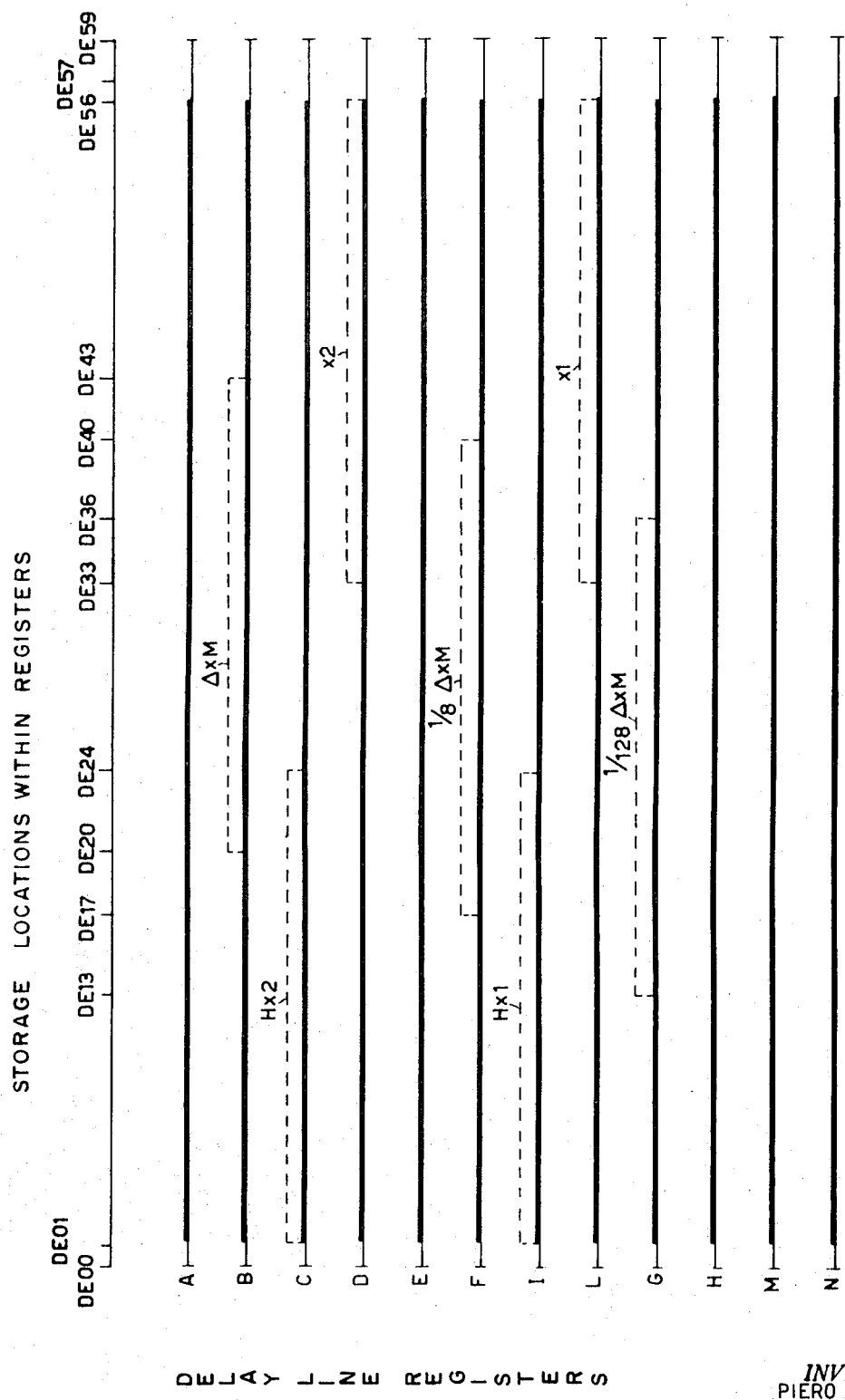
FIGS. 8 and 9 show the contents of various memory registers at two different stages.
Figure 9:
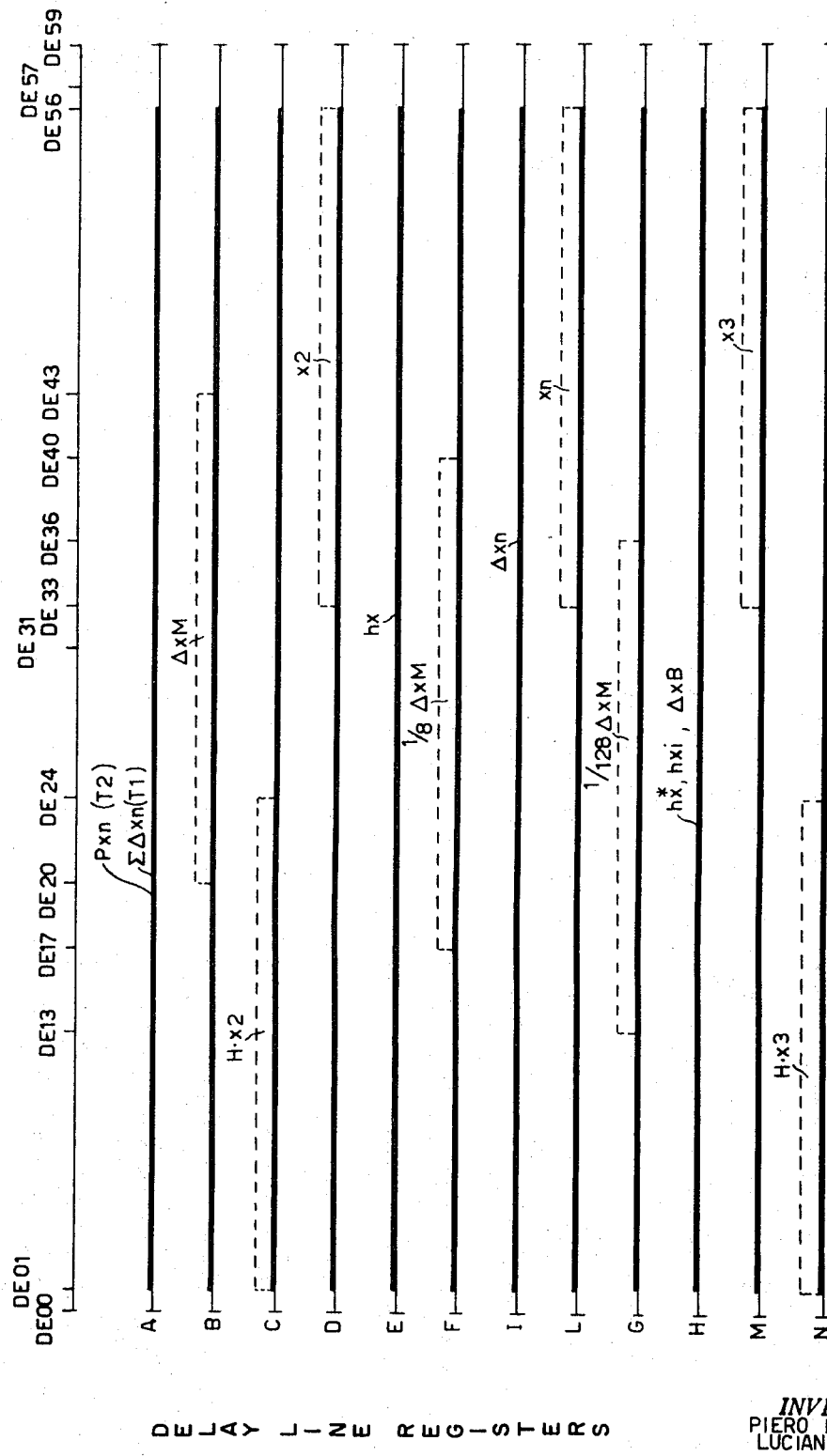

FIG. 8 relates to the arrangement of the various digital quantities in the memory registers during the entering phase, while FIG. 9 illustrates the arrangement of the digital quantites in the memory registers during the computation phase. The memory registers function in the following manner, referring to the axis X.

During the interpolation (FIG. 8), the register A serves to store the value $\Sigma\, Dxn$ obtained by operation (4), that is the progressive distance $xn - x1$, for the whole acceleration phase T1, and thereafter to keep stored the value $PxnM$ obtained on the basis of operation (5) at the end of the phase T1.

Into the register B there is introduced, in the phase of introduction of the data from the program unit (FIG. 8), the maximum increment $DxM$ (maximum permissible speed along the axis X). This value $DxM$ is initially written in the binary places DE17 to DE40 of the register B and is thereafter shifted by three places so as to be written in the places DE20 to DE43, where it is preserved unchanged until the program unit introduces another value or effects a modification thereof.

Into the register C there is introduced in the phase of introduction of the data from the program unit (FIG. 8) the coordinate $x2$ of the final point P2 shifted however, by $\log_2 H = 33$ binary places towards the least significant places. The register C therefore comes to contain the quantity $H \cdot x2$ necessary for calculating the speed increment $hx$.

Into the register D there is introduced, in the phase of introduction of the data from the program unit (FIG. 8), the coordinate $x2$ of the final point P2. This quantity is preserved unchanged in the register D throughout the interpolation for the purpose of permitting the execution of the operation (6) of calculation of the remaining distance to be travelled, when stopping must be effected at the final point of the rectilinear path segment in question.

At the end of the interpolation of a path segment, the contents of the register D are transferred to the register L and are preserved there to be used as the initial coordinate $x1$ of the next rectilinear segment. It has been seen, in fact, that the program unit only supplies the final coordinates of the rectilinear segments.

The register E serves to contain the speed increment $Dx$ during the interpolation phase (FIG. 9).

The register F serves to contain the quantity $1/n\ DxM$ during the entering and interpolation phases where $n$ is a preselected number, this quantity being introduced directly from the program unit into the register F in the binary places DE17 to DE40. The quantity $1/n\ DxM$ is used to modify the maximum speed of advance or feed $DxM$, and may illustratively be $\frac{1}{8}\ DxM$, as described in our substantially concurrently filed Patent Application Ser. No. 759,512 filed Sept. 16, 1968 by Piero Pomella and assigned to the assignee of the instant invention.

During the phase of introduction of the data of the recorded program into the memory, the value $DxM$ which characterizes the feed speed is introduced into the memory register B, while the value $\frac{1}{8}\ DxM$ is introduced into the register F. The value $DxM$ serves as a comparison term for establishing on the basis of operation (7) the end of the acceleration phase T1 and the begining of the constant-speed phase T2. The value $\frac{1}{8}\ DxM$ is used as an increment for modifying the contents of the register B by means of repeated addition or subtraction operations. It will be evident that other increment values can be used than $\frac{1}{8}\ DxM$, resulting in storage in register F of the value $1/n$, which is a predetermined number.

The device for varying the feed speed operates in synochronous fashion with the interpolator once the speed variation has been set. More precisely, since each interpolation cycle is composed of two memory cycles, one devoted to comparison operations and the other devoted to computation operations, the device for varying the feed speed operates by incrementing the speed $DxM$ in successive steps each comprising two memory cycles, one devoted to the scanning of the sign of the required incrementation and the other devoted to the incrementation of $DxM$ by an increment equal to $\frac{1}{8}\ DxM$.

The switch permitting the setting of a precentage value K of the programmed feed speed $DxM$ operates in jumps, each jump corresponding to a variation equal to $\frac{1}{8}\ DxM$. Therefore, if $q$ indicates the number of jumps of the switch from the normal position to the position marked by the percentage K, the state which must be achieved in the register B after $q$ incrementation steps is as follows:

$KDxM = DxM - q\ \frac{1}{8}\ DxM$.

At the end of the interpolation phase (FIG. 9), the quantity $H \cdot x2$ is transferred to the Register I, this quantity having been contained in the register C until that time. As a result of this transfer, the register I comes to contain the quantity $H \cdot x1$ valid for the next rectilinear segment to be covered, inasmuch as the final point P2 of a rectilinear segment coincides with the initial point P1 of the following rectilinear segment. This quantity $H \cdot x1$ is preserved in the register I only for the time sufficient to permit the calculation of $hx$, which, as has been said, occurs before the interpolation. During the interpolation (FIG. 8), therefore, the register I is free to contain the increments $Dxn$ as they are calculated.

The contents of the register L, into which, as has been said, the intial coordinate $x1$ of the following rectilinear segment to be covered is introduced from the register D at the end of the interpolation, are incremented bit by bit during the interpolation, so that the register L contains bit by bit the successive values of the instantaneous coordinate $xn$. It is therefore clear that the register L is adapted to feed the servo-systems and is therefore the only memory register whose output is connected to the converter 5. The functions of the remaining registers are explained hereinafter.

In FIGS. 8 and 9, the broken lines relating to the registers B, C and D represent that group of 24 adjacent binary places from among the 56 binary places of each register into which the relative datum is introduced from the program unit, while the broken lines relating to the registers F, I and L, represent the 24 adjacent binary places to which the data contained in the registers B, C and D respectively are transferred.

The functions and contents of the registers relating to the axes Y and Z are similar.

Computation Of The Speed For The Following Segment

The structure and operation of the device as regards the method of operation in which the movable part stops at each breakpoint of the segmented line forming the path to be followed have been described so far. According to the invention, the device comprises means adapted to control a second method of operation in which stopping at the break-points of the segmented line does not occur. It is clear that the choice of the method of operation may be made for each rectilinear segment of the path. For example, a special auxiliary function recorded on the program tape together with the block of data relating to a new break-point of the line may specify whether that break-point shall be passed at a speed different from zero.

More particularly, let us consider (FIG. 7) two path segments P1 – P2 and P2 – P3 having the common break-point P2. Let it be assumed that stopping of the movable part is not to be effected at P2, but that, on the contrary, the movable part is to travel along the path P1 – P2 – P3 with a substantial continuity of speed. In this case, the terminal portion of the segment P1 – P2 is covered at a speed which is constant and equal to the speed followed during phase T2 of the segment P1–P2. That is, the final phase (T3 and the following stages) of deceleration is eliminated. In turn, the initial portion of the segment P2–P3 is covered at constant speed, the initial phase of acceleration T1 relating to the segment P2–P3 being therefore eliminated. Moreover, steps are taken so that the movable part does not undergo too great a variation in speed as it passes through the break-point P2.

Of course, the initial portions of the segment P1 - P2 and the final portions of the segment P2 - P3 may be covered in an acceleration phase and a deceleration phase respectively, if stopping at the points P1 and P3 is provided.

As there must not be any stopping at the point P2, the interpolation phase relating to the segment P1 - P2 coincides in time with the phase of computation of the position increment ($DxB$, $DyB$) to be used in the segment P2 - P3. It is therefore clear that, while the interpolating unit controls in real time the position along the segment P1 - P2, the position increments ($DxB$, $DyB$) to be used in the following segment P2 - P3 are precomputed.

As the segment P1 - P2 may also be very short, the method of computation of the position increments ($DxB$, $DyB$) relating to the following segment P2 - P3 is not that hereinbefore described, this method having been modified for the purpose of obtaining a greater aggregate speed of computation. In fact, it is necessary that the computation be completed before the movable part reaches the break-point P2.

The principles according to which the increments $DxB$, $DyB$ are computed are as follows:
1. they must satisfy the conditions
$$DxB/DyB = (x3 - x2)/(y3 - y2) \qquad (11)$$

in such manner as to obtain the desired inclination of the segment P2 - P3;

2. moreover, the differences $DxB - DxM$ and $DyB - DyM$ (in which $DxM$ and $DyM$ are the maximum speeds to which reference has been made hereinbefore) must not exceed pre-established positive values equal to fractions of $DxM$ and $DyM$ respectively. More precisely, the aim ideally is to make the deviation in speed on passing through the break-point P2 very small for the axis along which the speed is greater.

The various phases of the computation of the increments $DxB$ and $DyB$ are as follows:

When the maximum speed $DxM$, $DyM$ is read from the tape, provision is also made for recording the values $1/128 \cdot DxM$ and $1/128 \cdot DyM$ in the registers G relating to the axes X and Y respectively, by the usual artifice of effecting the entering in a place shifted by $\log_2 128 = 7$ places.

Initially, the data block relating to the point P3 is read. More particularly, the coordinates $x3$ and $y3$ read in this way are stored in the places DE 33 to DE 56 of the registers M relating to the X and Y axes respectively, and also in the places DEO 1 to DE 24 of the registers N relating to the X and Y axes respectively.

On the basis of what has been stated hereinbefore, it is clear that the entering of the places DE33 to DE56 corresponds to preserving the original significance of the number entered in this way, while the entering performed in the places DEO 1 to DE24 corresponds to the entering in the registers N of the values $H \cdot x3$ and $H \cdot y3$, respectively, in which $H = 2^{-33}$.

Thereafter, the differences $H \cdot x3 - H \cdot x2$ and $H \cdot y3 - H^0 y2$ are produced, the result of which, $hx^*$ and $hy^*$, is introduced into the registers H relating to the axes X and Y, respectively.

Thereafter, the contents $hx^*$ and $hy^*$ of the registers H are shifted in the registers towards the most significant places, that is the contents are multiplied successively by 2, until the following result is obtained:

$$1/128 \cdot DxM > hx^* > 1/256 \cdot DxM \text{ or} \qquad (12)$$
$$1/128 \cdot DyM > hy^* > 1/256 \cdot DyM \qquad (13)$$

the shifting of $hx^*$ and $hy^*$ stopping when any one of the conditions (12) and (13) occurs. The value of $hx^*$ and $hy^*$ obtained in this way will be referred to as $hxi$ and $hyi$, respectively. Thereafter, $hxi$ and $hyi$ are repeatedly added to themselves until one of the conditions $$DxM < Shxi \text{ or} \qquad (14)$$
$$DyM < Shyi \qquad (15)$$

occurs between the sums $Shxi$ and $Shyi$ accumulated in this way and the maximum increments $DxM$ and $DyM$.

For the purpose of accelerating the accumulation of the values $Shxi$ and $Shyi$, instead of repeatedly adding $hxi$ and $hyi$ to themselves, the following procedure is adopted.

First, the sums $hxi + 128 \cdot hxi$ and $hyi + 128 \cdot hyi$ are formed.

If one of the conditions (14) and (15) occurs, the accumulation is blocked. Otherwise, the procedure continues by adding the quantity ($16 \cdot hxi$) repeatedly to the sum ($hxi + 128 \cdot hxi$) and at the same time adding the quantity $16 \cdot hyi$ repeatedly to the sum ($hyi + 128 \cdot hyi$) until one of the conditions (14) and (15) occurs, in which case the accumulation is blocked, or until the sum accumulated relative to the X axis exceeds $DxM - 16 \cdot hxi$ or until the sum accumulated relative to the Y axis exceeds $DyM - 16 \cdot hyi$. If one of the last two conditions occurs, the accumulation is continued by repeatedly adding $2 \cdot hxi$ and $2 \cdot hyi$, respectively, to the sums so far accumulated, until one of the conditions (14) and (15) occurs.

The result of the foregoing is that, for the axis for which the aforesaid condition of stopping of the accumulation has occured, the final sum accumulated differs from $DxM$ or $DyM$ by a value between $1/64$ and $1/128$ of $DxM$ or $Dym$, as the case may be.

For the other axis, on the other hand, the deviation between the sum accumulated and the relative maximum speed is, in general, greater.

The final sums accumulated in this way for the two axes X and Y constitute the position increments $DxB$ and $DyB$ to be used in the segment P3–P2. As the position increments accumulated bit by bit during the interpolation determine the instantaneous speed of the movable part, it is clear from the foregoing that during passage through the break-point P2 the speed along one axis does not present any substantial discontinuity, while along the other axis the deviation in speed is all the greater the greater the variation in the inclination between the segment P1 - P2 and the segment P2 - P3. In other words, the continuity of the movement through the point P2 is all the greater the smaller the variation in the inclination of the path.

Figure 7:
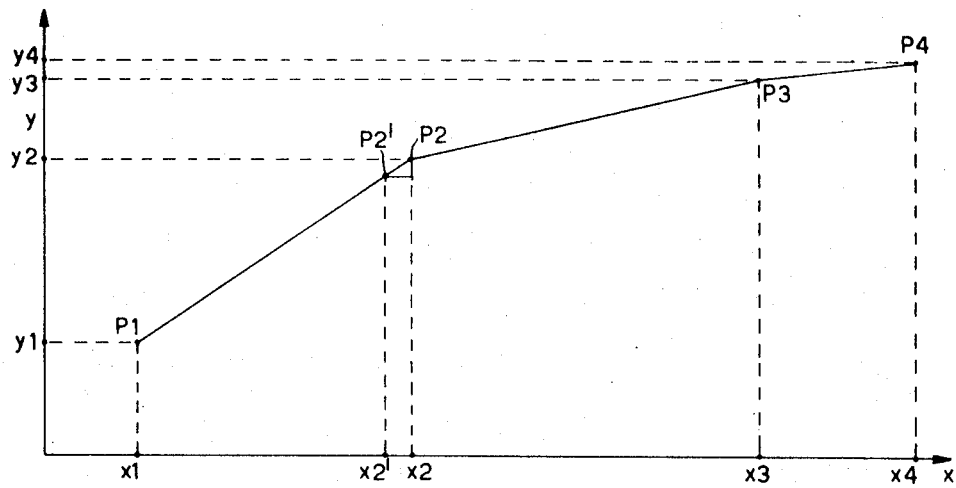
FIG. 7 shows successive segments of the path covered by the movable part in the device according to the present invention.
Figure 10:
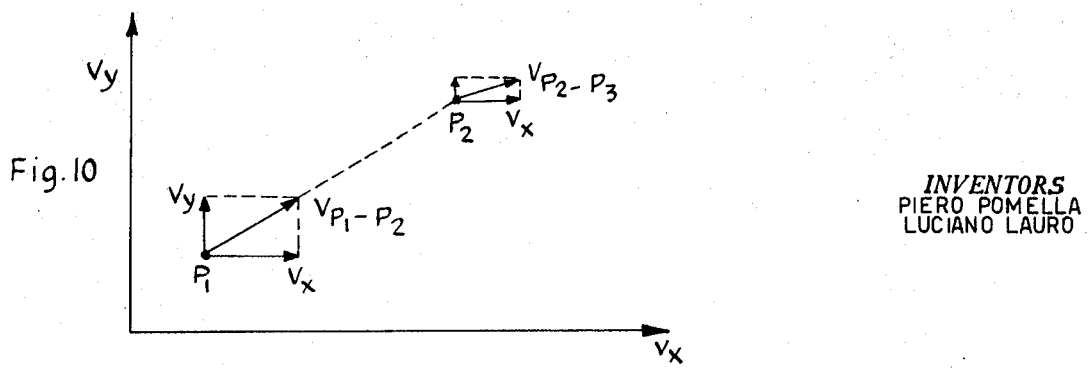
FIG. 10 shows a velocity diagram of the FIG. 7 movement.

This can be seen in FIG. 10 which shows the velocity vectors which correspond to FIG. 7. Note that the velocity in the X-direction is the same for the P1-P2 path as for the P2-P3 path. In order to achieve the direction change for P2-P3, the velocity in the Y direction is decreased.

It is moreover clear that, with equality of the maximum speed deviation allowed on each axis, the speeds $DxM$ and $DyM$, and therefore the speed of the movable part, may be chosen all the greater the smaller the deviation in the inclination of the path.

It follows from the foregoing that, for computation of the increments $DxB$ and $DyB$ which is carried out during the travel P1 – P2, it is also necessary to have available coordinates relating to the point P3, for the purpose of taking account of the slope of the segment P2–P3. It is therefore necessary to have available in the memory of the interpolator, registers G, H, M, N adapted to contain the data relating to the future segment P3 – P2 while the interpolator itself controls in real time the positioning along the present segment P2 – P1.

It is moreover clear that the time for reading a coordinate on the tape, plus the time for computing the increments $DxB$, $DyB$, must be small in comparison with the time of travel along the shortest segment which is provided in practice.

As has been said, the last portion of the segment P2 – P1 is covered at constant speed. As hereinbefore described, this is achieved inasmuch as the interpolator operating in real time repeatedly accumulates the position increments $DxnM$ and $DynM$ for the two axes X and Y, $DxnM$ and $DynM$ being the values considered in the first part of the description.

The accumulation of these constant increments, that is the travel at constant speed along the segment P1 – P2, terminates on the occurrence of the condition $K \cdot DxnM > x2 - xn$ or of the condition $K \cdot DynM > y2 - yn$, in which in a preferred embodiment $K = 1$ and, as has already been said, $xn$ and $yn$ are the present coordinates of the movable part, as computed by the interpolator. In other words, the travel at constant speed along the segment P1 – P2 terminates at a point P2' (FIG. 7) which is in front of P2 and is at a distance therefrom of less than $K \cdot DxnM$ along the axis $x$ and less than $K \cdot DynM$ along the axis $y$.

The occurrence of the terminal condition of the constant speed phase (point P2') produces the transfer of the coordinates X2 and Y2 from the register D to the register L (this latter feeding the servo-mechanism) in replacement of the coordinates of the point P2' and the transfer of the coordinates X3 and Y3 from the register M to the register D in place of the coordinates X2 and Y2, and the transfer of the increments $DxB$ and $DyB$ from the register H to the register I to replace therein the old increment relating to the segment P1 – P2.

The accumulation of the position increments in the interpolator therefore recommences immediately. More particularly, starting from this moment, the accumulation takes place by repeatedly adding the new constant increments $DxB$ and $DyB$ at each interpolation cycle to the coordinates X2 and Y2 which were placed in the registers assigned to the accumulation.

Since, before the commencement of the interpolation, in order to cover the segment P2 – P3, the coordinates of the final point P2' are replaced by those of the new initial point P2 (coinciding with a theoretical point of the path), it is clear that any errors due to the differences P2 – P2' do not accumulate from one segment to the other.

It should moreover be observed that, having arrived at the point P2', the registers G, H, M and N are rendered free and available for the computation of the position increments relating to the segment P3 – P4. Moreover, it is clear that, when the computation of the increments $DxB$, $DyB$ relating to a certain segment has been effected, the registers are adapted to preserve the results thus obtained until the end of the travel along the preceding segment.

If, together with the new coordinates X3 and Y3, an auxiliary-function code indicating that the movable part must stop at the point P3 has been read from the tape, the mechanism computing and controlling the deceleration, as hereinbefore described, is rendered operative again for the segment P2 – P3.

It is therefore clear that the device according to the invention makes it possible to render continuous the movement of the movable part along a path defined on the tape simply by means of the coordinates of breakpoints P2, P3, P4, etc.

It will be understood that many changes may be made in the embodiment of the invention disclosed herein without departure from the invention. Accordingly, the invention is not to be considered limited to the embodiment disclosed but rather only by the scope of the appended claims.

We claim:

1. A numerical control device for positioning a movable member along at least one axis, comprising a programming unit adapted to furnish discontinuously the coordinates of breakpoints of a segmented path to be followed by the movable member, and an interpolating unit fed said break-point coordinates by said programming unit and operating cyclically to compute, in respect to each axis, the coordinates of the successive positions along said path for supplying and controlling in real time a movable member positioning servo-system pertaining to that axis, the interpolating unit being adapted to cause said member to traverse a breakpoint between first and second segments of said path, with the velocity component for the axis along which the speed is greater being held substantially constant through the traversal of the first and second segments, said interpolating unit including accumulator means for accumulating during each cycle a position increment which is variable from cycle to cycle to control the speed and acceleration of the movable member positioned by said servo-system, means for precomputing the position increments of the member along an axis, said precomputer position increments to be fed by said interpolator to said servo-system to control the member over the initial part of the second segment of the path, and for temporarily storing the output of said precomputing means until used to control said servo-system.

2. A device as claimed in claim 1 for positioning the movable member along two or more axes wherein said precomputation means include means for computing advance position increments ($DxB$, $DyB$) along the axes for the second segment of the path, the ratio of said advance position increments to each other along the axes being the same as the ratio of the differences between the coordinates of the end of the first segment and the coordinates of the end of the second segment $DxB/DyB = (x3 - x2)/(y3 - y2)$, said position increments being chosen are to be as large as are consistent with the constraint that none shall exceed a maximum predetermined increment ($DxM$, $DyM$) predetermined for each of the corresponding axes.

3. A device as claimed in claim 2, wherein said interpolating unit includes means for calculating in real time the position increments along the first segment (P1 – P2) of said path.

4. A numerical control device as claimed in claim 3, wherein said real time calculating means includes the accumulator means (A, B, C, D, E, I, L) for storing position increments and of the coordinates of axes segment then being traversed by said movable member, and means for transferring the contents of said temporary store to said accumulator means thereby replacing the data in said accumulator means relating to the first path segment being travelled and rendering said temporary store available for holding data pertaining to a future segment (P3 – P4).

5. A device as claimed in claim 4, wherein the interpolating unit includes means for determining a point (P2') spaced from the breakpoint (P2) at the end of the first segment along one of said axes by a distance less than a limit commesurate with the constant position increments accumulated in covering at constant speed at least the final part of the first segment, said interpolating unit including means responsive to said point determining means for terminating the accumulation of position increments relating to the first segment (P1–P2) and for initiating the transfer of position increments precomputed for the second segment (P2–P3) from said storage means.

* * * * *